Jan. 13, 1948.        H. G. BEEDE        2,434,482
ADJUSTABLE ACTUATING MEANS FOR GARMENT PRESSING MACHINES
Filed July 31, 1941         6 Sheets-Sheet 2
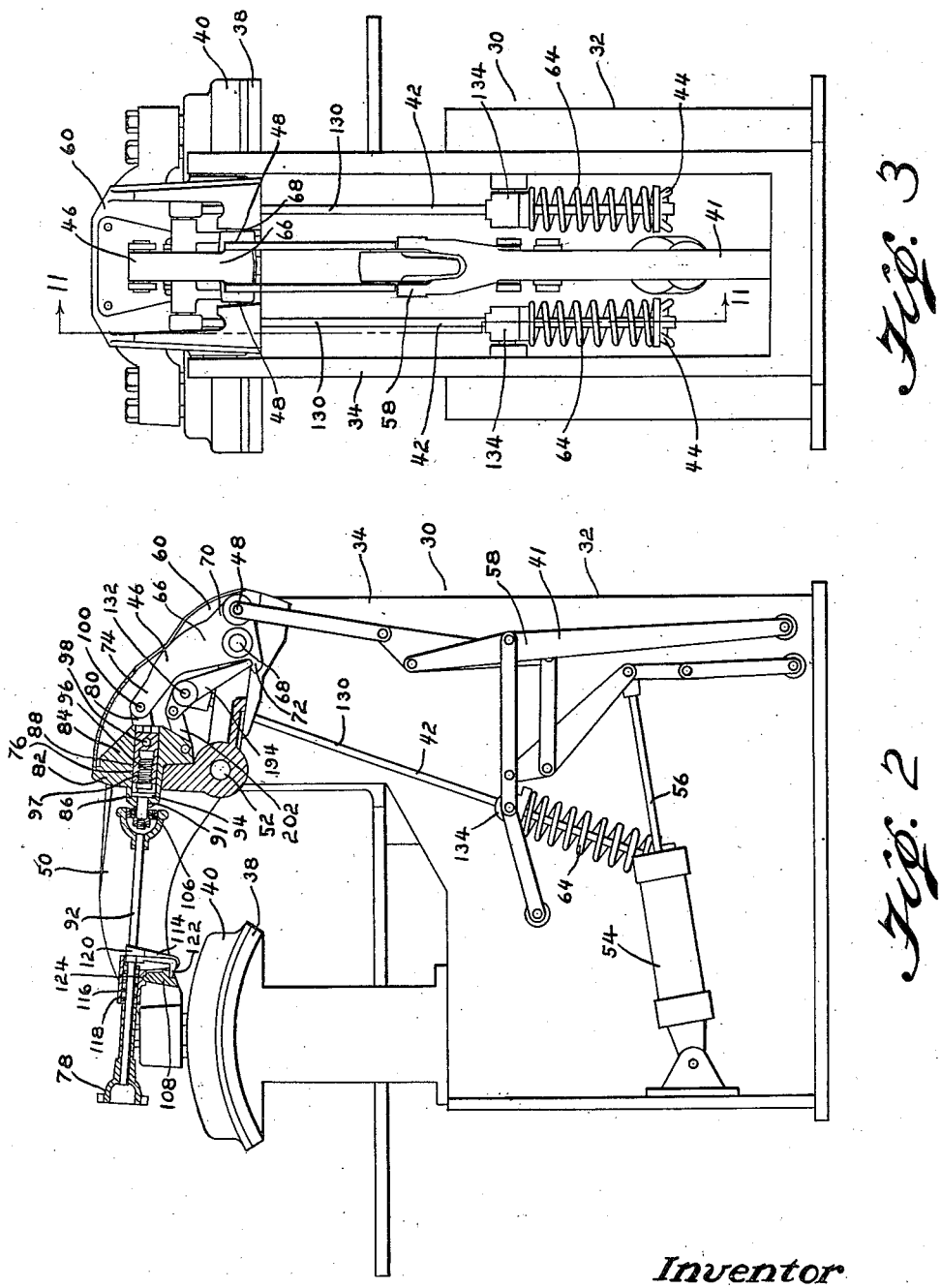
Inventor
Herbert G. Beede
By Thomas A. Jewelee
Attorney Inventor
Herbert G. Beede
By Thomas A. Jenckes
Attorney Jan. 13, 1948. H. G. BEEDE 2,434,482
ADJUSTABLE ACTUATING MEANS FOR GARMENT PRESSING MACHINES
Filed July 31, 1941 6 Sheets-Sheet 5

Inventor
Herbert G. Beede
By Thomas A. Jenkes
Attorney

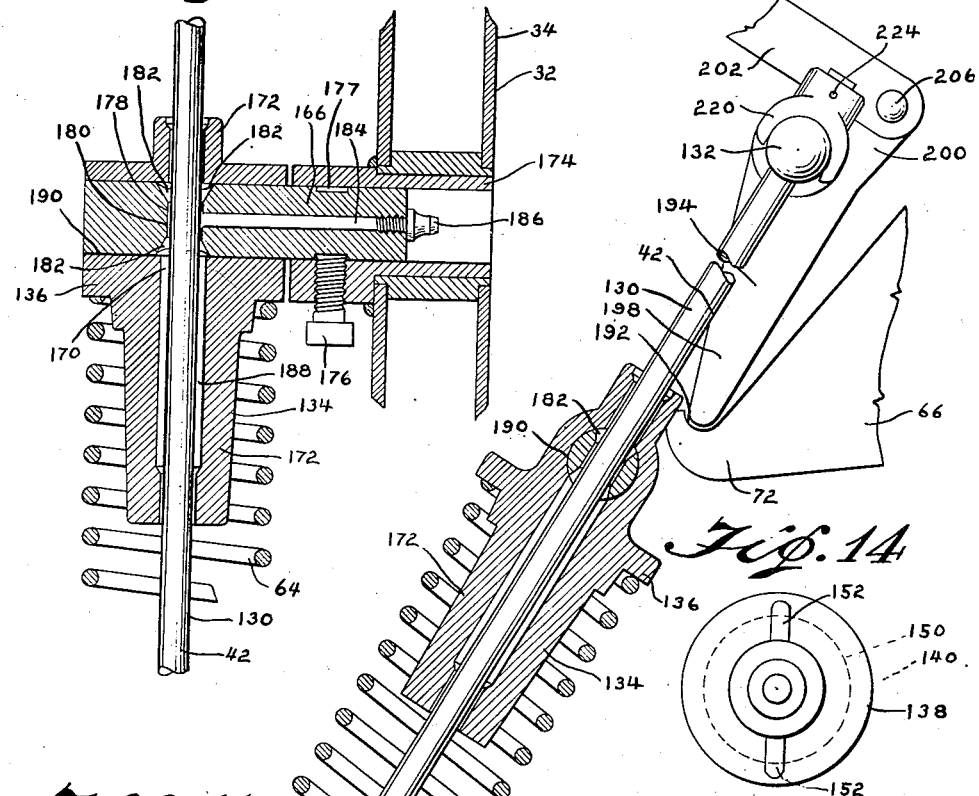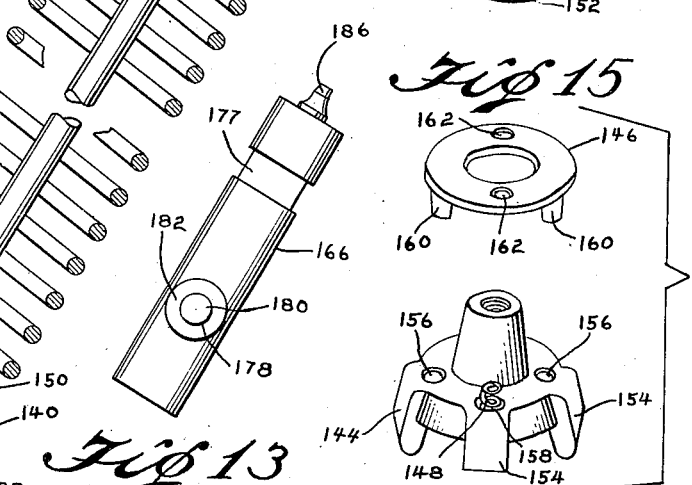

Patented Jan. 13, 1948

2,434,482

UNITED STATES PATENT OFFICE 2,434,482

ADJUSTABLE ACTUATING MEANS FOR GARMENT PRESSING MACHINES

Herbert G. Beede, Pawtucket, R. I., assignor, by mesne assignments, to Pantex Manufacturing Corporation, a corporation of Delaware Application July 31, 1941, Serial No. 404,870

6 Claims. (Cl. 38—36)

My invention relates to improvements in adjustable actuating means for garment pressing machines and specifically includes improvements in the structure of the pressing member disengaging spring means itself, and improvements in the adjusting means for shifting the point of connection of the actuating means to close the press to adjust the final pressing space between said pressing members, whereby the disengaging spring means may also function to take up any backlash in said adjusting means.

A further feature of my invention relates to specific improvements in the structure of the adjusting means itself providing a simpler, more positive and more evenly balanced adjusting means than hitherto provided.

A further object of my invention is to provide improvements in the specific structure of the disengaging spring and its associated parts, whereby it may be more readily attached to said adjusting means to function to take up the backlash therein, and may function in a more positive manner to disengage the pressing members.

A further object of my invention is to employ a compression spring as the actuating force of the disengaging mechanism, it being obvious that a compression spring will positively not break in use in a manner to let down the pressing head, thereby insuring the safety of my improved garment pressing machine for the operators.

A further feature of my invention is to provide a disengaging mechanism in which the tension thereof may be readily adjusted without friction against any portion of the powerful disengaging spring thereby permitting the ready manual adjustment of the tension thereof in use, which feature may be applied to any type of a spring.

Further features of my invention relate to improvements in the specific structure for mounting the disengaging spring mechanism on the side of the frame so that the rod element thereof may have a reciprocating movement as well as an oscillating movement in a plane parallel to the plane of movement of the pressing lever.

A further object of my invention therefore, is to provide an adjustable disengaging spring mechanism, wherein the spring portion thereof not only functions to take up any backlash in the adjusting means, but also functions to retain the tension adjusting means of the spring itself in adjusted position thereon.

A further object of my invention is to provide improvements in the structure of the adjusting means itself, whereby the handle extending axially of the pressing lever power arm for ease of adjustment from the front of the machine may be tilted laterally, if desired, for the addition of other mechanisms to the pressing lever.

These and such other objects of my invention as may hereinafter appear will be best understood from a description of the accompanying drawings which illustrate various embodiments thereof.

In the drawings,

Fig. 2 is a side elevation of the garment pressing machine shown in Fig. 1 and is similar thereto with the exception that the means for mounting the handle for the adjusting means on the work arm of the pressing lever is additionally shown in section and with parts thereof removed, in closed position.

Fig. 3 is a rear elevation of the parts of the garment pressing machine shown in Fig. 2.

Fig. 11 is a vertical sectional view taken through the disengaging spring mechanism along the line 11—11 of Fig. 3 and illustrating how it is mounted on the pressing machine frame and connected to the actuating mechanism.

Fig. 12 is a vertical sectional view taken at right angles to the side wall of the frame illustrating how the reciprocating rod of the disengaging spring mechanism is mounted on the side wall of the frame.

Fig. 13 is a perspective view of the shaft I employ for mounting said reciprocating rod on the side wall of the frame.

Fig. 14 is a reverse plan view of the latching ring I preferably employ.

Fig. 15 is a disassembled perspective view illustrating the latching washer I preferably employ about to be secured to the turning nut to rotate therewith.

In the drawings, wherein like characters of reference indicate like parts throughout, 30 generally indicates a pressing machine constructed in accordance with my invention.

Figure 1:
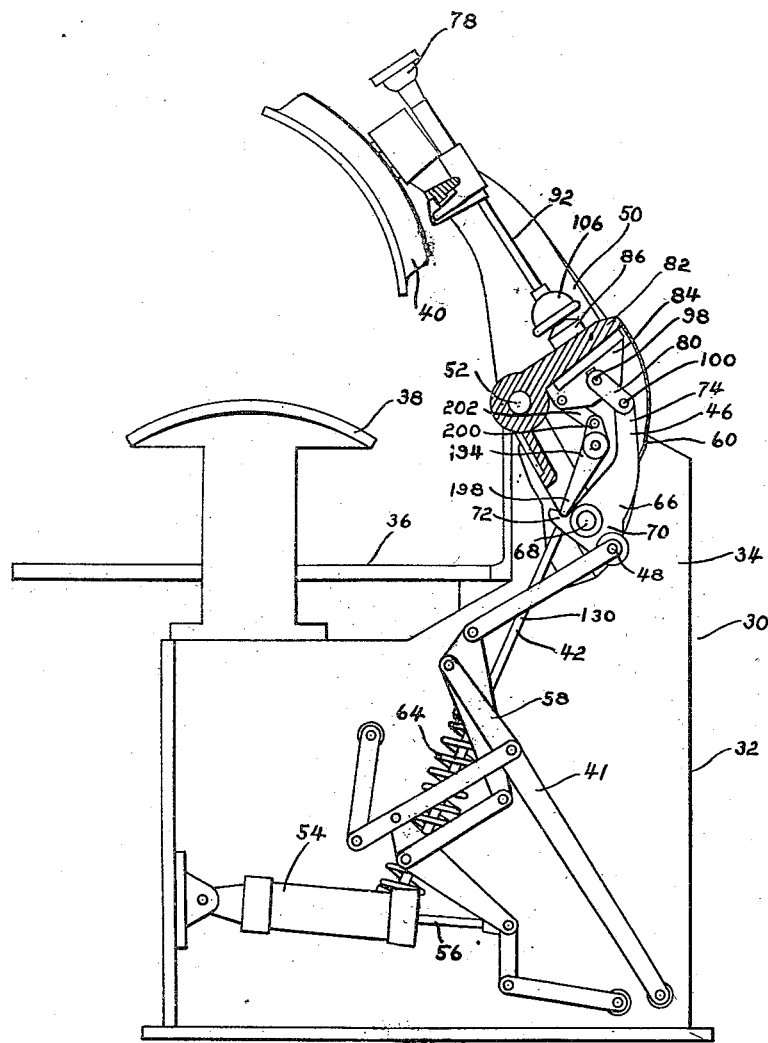
Fig. 1 is a side elevation of a garment pressing machine constructed in accordance with my invention in open position with one side wall removed and with the means for covering the adjusting means and points of connection of the actuating means and the disengaging spring means thereto broken away.

Said pressing machine is provided with the usual frame 32 having the side walls 34, the table 36 and the usual stationary pressing buck 38 projecting upwardly from said frame above said table, said pressing buck functioning as a pressing member. In this type of machine there is also provided a movable pressing member 40 movable relative thereto and actuating means 41 are usually provided operatively connected to said movable member 40 for moving said member 40 into pressing juxtaposition with said other member 38. In the embodiment shown, disengaging spring mechanism 42 is operatively connected to said movable member 40 for normally moving said member 40 from pressing juxtaposition with said other member 38. If desired, adjustable means 44 having a portion thereof abutting said spring disengaging mechanism 42 may be employed for varying the tension exerted by said spring disengaging mechanism 42 and in addition adjusting means 46 are preferably provided for shifting the point of connection 48 of the actuating means 41 to said movable pressing member 40 to adjust the final pressing space between said pressing members, the adjustment of said adjusting means being at all times made against the pressure of the spring means in the disengaging spring mechanism 42, whereby said spring means may also function to take up any backlash in said adjusting means 46 and retain said spring adjusting means 44 in adjusted position thereon. The specific type of adjusting means 46 and spring disengaging mechanism 42 shown is specifically adapted for use on a garment pressing machine employing a stationary buck 38 projecting upwardly from the front of the frame 32 thereof and having a pressing lever 50 pivotally mounted intermediate its ends on the longitudinal pivot pin 52 extending longitudinally between the side walls 34 of said frame having the pressing head 40 mounted on the front end thereof. It is thus obvious that pivoting of said pressing lever 50 which pivots or oscillates in a transverse plane extending fore and aft of said pressing machine, brings said pressing head 40 into and away from pressing juxtaposition with said buck 38. Any suitable type of actuating means 41 may be provided suitably connected to said pressing lever to move it into pressing juxtaposition with said buck. In the embodiment shown, however, I preferably employ for this purpose a pivoted fluid actuated cylinder 54 pivotally mounted on the front of the frame having the piston 56 reciprocable therein to actuate suitable linkage 58 pivotally connected to the power arm 60 of said pressing lever, in the embodiment shown, being specifically connected to a portion of the adjusting means 46 thereof. While any suitable type of linkage may be employed, I preferably employ the type of linkage shown and claimed in the copending application for patent of Frank C. Lornitzo for Safety control for pressing machines, Patent No. 2,382,322, dated August 14, 1945, although any type of linkage may be employed. This specific type of linkage, however, quickly brings the pressing head 40 into pressing juxtaposition with the buck 38 during the initial even stroke of the piston 56 and then with the relatively short movement of the pressing head supplies an optimum amount of pressure to the pressing buck 38 during the continuation of the even stroke of the piston 56 in the cylinder 54. With this construction the linkage 58 is connected to the adjusting means 46 mounted on the power arm 60 of said pressing lever 50.

In the embodiment shown, a suitable type of disengaging spring means 42 is also positively connected to said pressing lever, in this instance, to another portion of the adjusting means 46 mounted on the power arm 60 of said pressing lever. Said spring disengaging mechanism 42 is so connected as to normally move said pressing head 40 away from said buck 38 by lowering the power arm 60 of said pressing lever, the pressing head 40 being suitably mounted on the work arm of said pressing lever in the usual manner, and a compression spring 64 is employed as the actuating spring means thereof. The adjusting means 46 for shifting the point of connection of said actuating means 41 to said pressing lever to adjust the pressing space between the pressing head 40 and buck 38 is also preferably mounted on the power arm 60 of said lever in a manner to be readily adjusted with the spring means 64 of the disengaging spring mechanism 42 continuously functioning against said adjusting means 46 so that said spring means 64 will also function to take up any backlash in said adjusting means 46. In the embodiment shown, said adjusting means 46 includes an adjusting member 66 pivotally mounted on a longitudinal pivot pin 68 suitably mounted on said power arm 60, for movement relative to said power arm having an arm 70 containing the pivotal connection 48 for pivotally securing said actuating means 41 thereto to rotate said member 66 in one direction to raise said pressing lever power arm, a counterbalancing arm 72 and a crank arm 74. The spring disengaging mechanism 42 acts upon said counterbalancing arm 72 in the manner to be explained to rotate said member 66 to lower said pressing lever power arm. I also provide manually actuated axially movable means 76 mounted on and threadedly connected to said pressing lever 50 to move axially thereof operated by the operating handle 78 and I provide a connecting rod 80 connecting said adjustable member crank arm 74 to said axially movable means 76, whereby axial adjustment of said manually actuated means 76 may adjustably rotate said adjusting member 66 against the pressure of said spring means 64 to vary the point of connection 48 of said actuating means 41 to said pressing lever power arm 60.

The axially movable adjustable means 76 is substantially identical to the means shown for the same purpose in my prior patent for Garment pressing machine, No. 2 026,264, issued December 31, 1935, modified, however, in the following manner: The pressing lever 50 of the power arm is provided with a plate 82 projecting vertically thereof when in closed position substantially above the pivot point 52 thereof. A guide bearing 84 is secured in any suitable fashion to the rear surface of said plate 82, in the embodiment shown, being integral therewith. Said plate is also provided with the boss 86 projecting integrally forwardly thereof. A bore 88 is provided in said integral plate 82 and guide bearing 84 and a bore 91 of smaller diameter is provided in said forwardly projecting boss 86. The handle rod 92 extends through said bore 91 and has an enlargement 94 for seating against the front end of said bore 88 and terminates in an externally threaded rear end 96. The axial movable member 76 comprises a hollow adjusting nut 76 having an internally threaded periphery 97 engageable with the outer threaded periphery 96 of the handle 92 so as to be axially slidable within said bore 88 on rotation of said handle rod 92. The front end of the connecting rod 80 is pivotally connected to the rear end of the nut 76 by the pivot pin 98, the rear end of said connecting rod 80 being pivotally connected to the end of the crank arm 74 by the pivot pin 100. If desired, a pair of connecting rods or links 80 may be provided for each side of the axially slidable nut or member 76 and the rear end of the crank arm 74. As shown in said patent, the handle rod 92 is broken into a front portion 102 and the rear portion 104 having an external periphery 96 hitherto described and said parts of the handle are connected together by the universal connection 106 of the general type shown in said patent.

Figure 4:
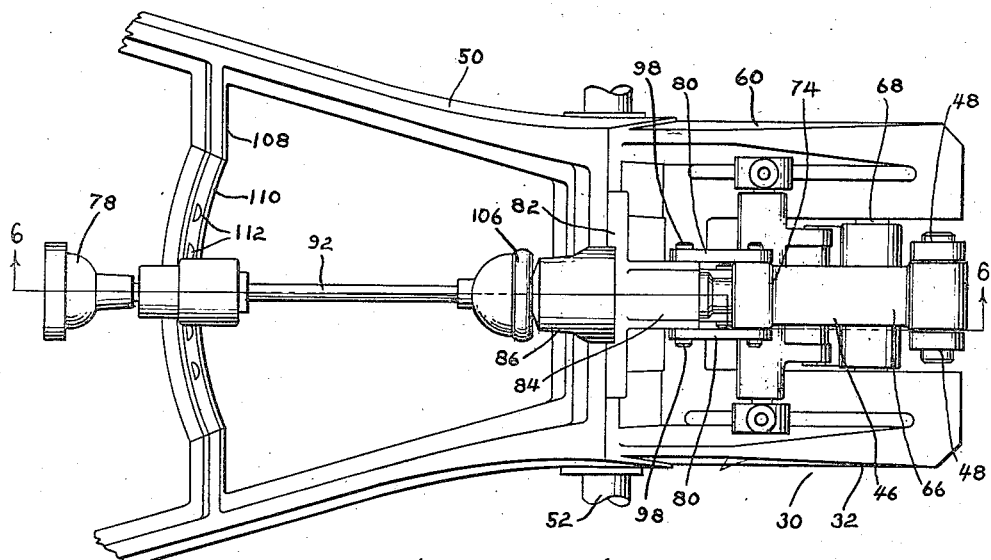
Fig. 4 is a diagrammatic plan view of the pressing lever and connecting parts with the front portion of the pressing head removed.
Figure 5:
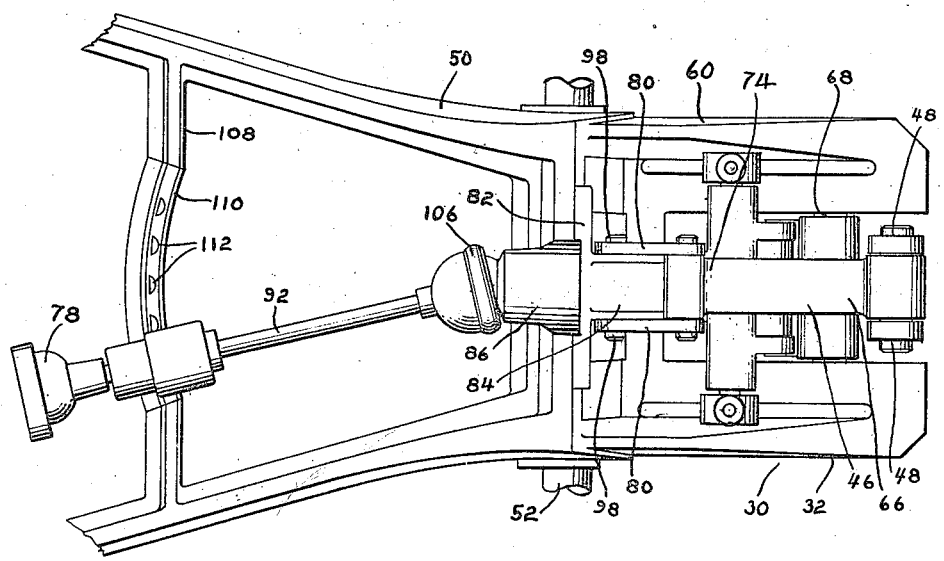
Fig. 5 is a plan view of the parts shown in Fig. 4 with the handle for the adjusting means tilted laterally and latched.
Figure 6:
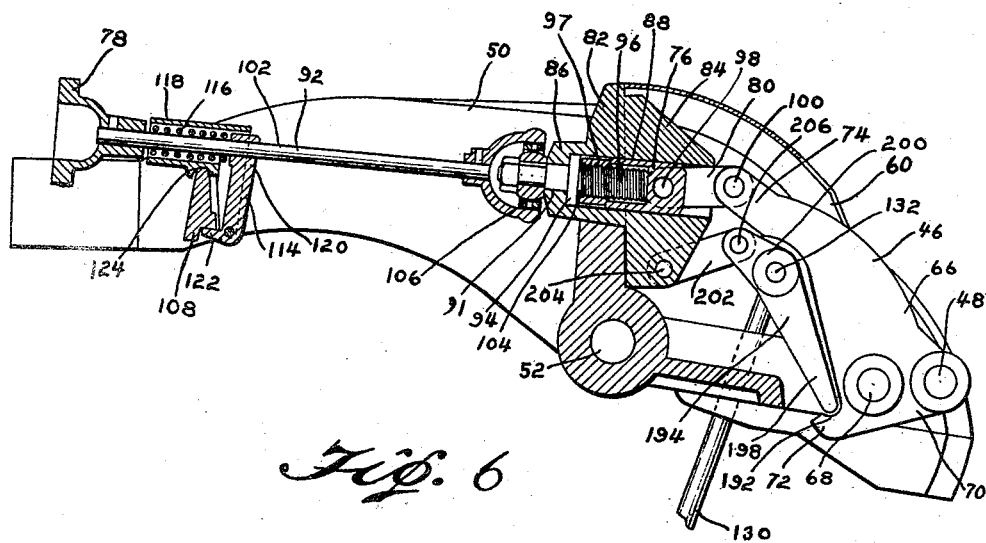
Fig. 6 is a vertical sectional view taken along the line 6—6 of Fig. 4 with the adjusting means adjusted to leave a space between the pressing members in final adjusting position.
Figure 7:
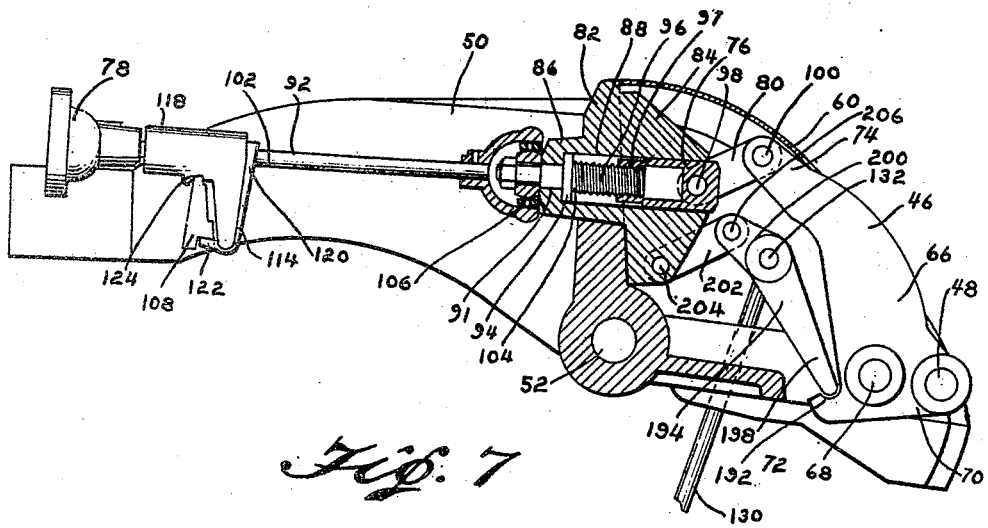
Fig. 7 is a vertical sectional view similar to Fig. 6 with the means for latching the adjusting handle to the work arm of the pressing lever shown in elevation and with the adjusting means moved to a position bringing the pressing head close to the pressing buck in final pressing position.

As shown in Figs. 4 and 5 a bar 108 extends horizontally across a front end of said pressing lever 50 having an arcuate portion 110 centrally thereof provided with spaced locking depressions 112 on the rear surface of the upper end thereof. The front portion 102 of the operating handle rod 92 is provided with a suitable spring actuated latch 114 comprising a spring 116 contained within a suitable housing 118 on said front portion 102 tilting the upper end 120 of the latch 114 so that the projection 122 projecting forwardly from the lower end thereof may be engaged underneath said wall 110 when the notch 124 on the lower surface of said housing 118 has sunk into a selected depression 112. As stated, one feature of my invention is that the handle 92 for the axially movable adjustable means 76 is provided with a universal joint 106 in front of its threaded connection 96 and 97 to said axially movable member 76 and the front portion 102 of said handle carrying the turning handle 78 is tiltable to a plurality of angular positions on said power arm. It is thus obvious that by unlatching the latch 114 by pressing on the arm 120 thereof the projection 122 thereof is released from engagement with the lower surface of said arcuate wall 110 so that said portion 102 may be readily lifted free of said wall on said universal joint 106 and swiveled laterally on the universal joint 106 so that it may be locked in a different position thereon as shown in Fig. 5.

As stated hitherto, if desired, the disengaging spring mechanism 42 may be employed independently of any adjusting means 46 and my invention relates to improvements in the disengaging spring mechanism itself, whether or not it be employed in association with any adjusting means 46. While, in the embodiment shown, I have employed a pair of identical disengaging spring mechanisms 42, one connected to each side of the power arm 60 of said pressing lever and anchored to a respective side wall 32 of the frame for use in association with the specific adjusting mechanism shown herein, it is obvious that either one or a pair of the specific mechanisms shown may be employed directly connected to the power arm of the pressing lever for normally tilting the pressing lever to move the pressing head away from said buck if the adjusting mechanism be not employed.

In the embodiment shown, said mechanism includes a rod 130 pivotally connected to the pressing lever as at 132 to move therewith, bearing means 134 including a plate 136 for mounting said rod 130 on said frame for reciprocating movement and for oscillating movement in a single transverse plane parallel to the plane of movement of the pressing lever, adjusting means 44 adjustably mounted on the lower end of said rod 130 and the adjusting counter-balancing spring 64 having one end thereof abutting said adjusting means 44 and the other end abutting said plate 136.

Inasmuch as the adjusting means 138 for varying the tension of the spring 64 is the same in both embodiments shown it will now be described. A suitable latching ring 138 is provided having a suitable inner surface 140 for abutment of the lower end of the spring 64 thereagainst and is slidably mounted on the outer end of said rod 130, said rod 130 having an externally threaded portion 142 beyond said slidable latching ring 138. A nut 144 is threadedly adjustable on said threaded lower end 142 of said rod 130 and interengageable male and female adjusting means are provided so that the nut may be turned independently of the friction of the tension spring 64 against the surface 140 of said latching ring 138. I have found from experience that in pressing machines to suitably lower the power arm of the pressing lever, it is necessary to provide a compression spring 64 of such strength that it is almost impossible to vary the tension thereof by a simple nut threaded on the lower end of the rod 130 and it is for this purpose that I interpose the latching ring 138 between said nut 144 and outer end of said spring 64. In order, however, that the adjustment of tension of the spring may be still easier, I preferably interpose an independently axially slidable latching washer 146 between said latching ring 138 and nut 144 and construct said latching washer 146 so that it may be readily rotated by said nut and I interpose additional spring means 148 between said latching washer 146 and nut 144 to cause engagement of said male means with said female means, the spring 148 thus axially moving said latching washer for interengagement of said male and female latching means but being so light that it may readily yield to permit facile rotation of said nut to urge said latching washer 146 and latching ring 138 axially of said rod 130 without rotation of the lower end of the spring 64 against the surface 140 of said latching ring 138. In the embodiment shown, the latching ring 138 is provided with the exterior annular inner surface 140 and the hub portion 150 projecting axially inwardly thereof to more accurately align the lower end of the spring relative to said rod 130. The outer surface of said latching ring 138 is provided with the diametrically spaced female latching recesses 152 thereon. While I have shown said recesses 152 diametrically spaced, it is obvious that they may be spaced any suitable desired amount.

The nut 144 may be provided with the spaced projections 154 projecting outwardly therefrom for ease of gripping thereof between the fingers and as shown in Fig. 15, said nut 144 is preferably provided with a plurality of hole means 156 and 158 on the inner surface thereof. In the embodiment shown, certain of said hole means 156 are diametrically spaced while other of said hole means 158 may be spaced intermediate said diametrically spaced hole means 156. The independently slidable latching washer 146 is provided with the prongs 160 projecting axially outwardly therefrom diametrically thereof adapted to register in said hole means 156 to be axially aligned with and axially movable relative thereto to cause rotation of said latching washer 146 on rotation of said nut 144. The spring means 148 is provided in the other of said hole means 158 to axially urge said latching washer 146 inwardly. The inner surface of said latching washer is provided with the cooperating diametric latching mounds 162 adapted to register within the diametric latching recesses 152 on the lower surface of said latching ring 138 on each half rotation of said nut 144 and latching washer 146. It is thus obvious that the latching washer 146 is gently urged axially inwardly by the light spring 148 of sufficient torsion to keep the latching mounds 162 in register with the latching recesses 152 at all times. The torsion of the spring 148, however, is so relatively light that on the turning torque which may be readily exerted on the nut 144 by the fingers it will axially yield to permit a half revolution of the nut 144, the mounds 162 slipping out of the recesses 152 readily on the turning of the nut to compel inward axial movement of said latching ring 138 and consequent compression of the spring 64 resulting on clockwise rotation and hence inward axial movement of said nut 144, and outward axial movement of said latching ring 138 by said spring 64 and consequent release of compression of the spring 64 resulting on counter-clockwise rotation and hence outward axial movement of said nut 144. If desired the relative positions of the male mounds 162 and female recesses 152 on the adjacent surfaces of the latching ring and latching washer may be reversed if desired. It is obvious that all adjustment is independent of the friction of the lower end of the spring 64 against the latching ring 138, whether or not the latching washer 146 be supplementally employed, the use of the latching washer, however, permitting a more facile adjustment of the compression spring 64. It is obvious that as the compression spring 64 is compressed to store up energy, even if it should break it will continue to hold the press open, whereas if the tension springs of the prior art break, they immediately let the pressing head 40 down and have caused accidents.

Figure 8:
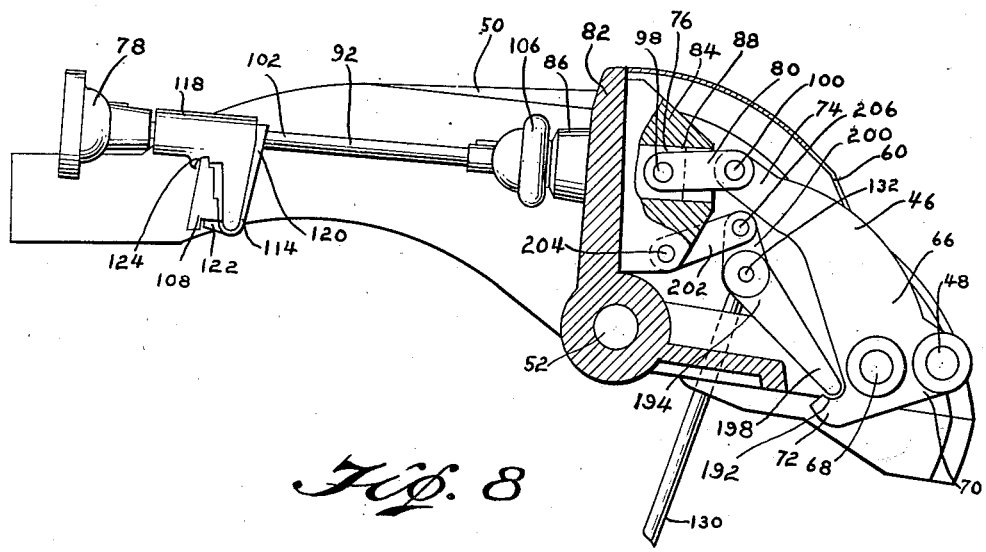
Fig. 8 is a vertical sectional view similar to Fig. 7 with the floating lever of the adjusting means inverted to provide a less counterbalancing effect for the attachment of a lighter pressing head to the pressing lever, but still employing the same spring.
Figures 9, 10:
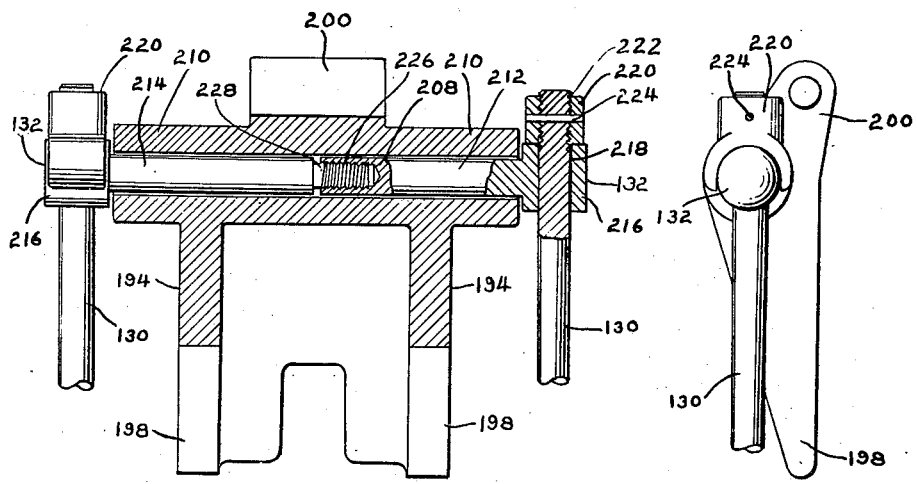
Fig. 9 is a vertical sectional view through the rod for joining the pivot points of the floating levers together.
Fig. 10 is a diagrammatic end elevation showing how the floating lever may be attached to the upper end of the disengaging spring rod in the reversed position shown in Fig. 8.

As stated hitherto, the bearing means for mounting the rod 130 on a stationary side wall 32 of the frame 30 for reciprocating movement and for oscillating movement in a plane parallel to the tilting plane of the pressing lever for oscillation relative to said bearing means comprises in both embodiments shown, a base 166 rigidly mounted on said side wall 32 having a plate 136 mounted thereon having a hole 170 therein containing said rod and an elongated, preferably hollow lubricant containing bearing 172 for said rod projecting downwardly from said plate 136 pivotally mounted to oscillate on said base 166. In the preferred embodiment of my invention shown in Figs. 1–15 said bearing means is preferably constructed as follows: The base 166 comprises a shaft 166 having a cylindrical outer end projecting substantially at right angles from a frame side wall 32 and secured thereto in any suitable manner, such as by the sleeve 174 shown in Fig. 12 rigidly soldered to a side wall 32 of said frame and having a lock screw 176 having the end thereof registering in a circumferential channel 177 in said shaft 166 rigidly securing said shaft 166 to said sleeve. The shaft 166 is provided with the generally vertical hole 178 therein preferably centrally constricted as at 180. As shown, the central constriction 180 may be provided by providing the hole with the central portion 180 of smaller diameter than the respective ends of the hole and the frustoconical portions 182 flaring outwardly from said constricted central portion 180 to the ends of said hole. For lubricating purposes, if desired, a central conduit 184 may be provided extending axially outwardly from the constricted portion 180 of said hole and having a suitable Zerk 186 fitting on the inner end thereof. The rod 130 is adapted to be held against substantial lateral movement by the constricted portion 180 of said central hole 178, yet permitted an oscillating or tilting movement therein by the frusto-conical portions 182 of said hole 178. To suitably mount said rod 130 for reciprocative movement and oscillating movement on the inner end of said shaft 166 I provide a suitable bearing sleeve 172 embracing said reciprocating rod 130, in the embodiment shown, for a substantial distance above and below said shaft having the central lubricant containing chamber portion 188 of larger diameter than said rod 130. Said bearing sleeve 172 is provided with a hollow hub portion 190 oscillatably mounted on the inner end of said stationary shaft 166 so that said reciprocating rod 130 may extend through said hole 178 in said shaft and freely oscillate on said shaft while reciprocating within said bearing sleeve 172. It is obvious that the Zerk fitting 186 comprises means for inserting lubricant through said axle shaft conduit 184 to within said lubricant containing chamber 188 in said bearing sleeve 172. It is obvious that the upper or inner end of the spring 64 may abut the outer or lower surface of said plate 136, said plate 136 comprising a flat annular surface on the lower surface of said hub 190 exterior of said bearing sleeve 172. It is thus obvious that with this construction the outer surface of the plate 136 is always parallel with the inner annular surface 140 of the latching ring 138, thereby applying an even compression on the ends of the spring 64 at all times, and eliminating any angular strain on the spring which would tend to make it buckle and break. As stated, however, the improved type of disengaging spring mechanism 42 shown, is adapted to be employed in association with the adjusting means 46 so that the spring 64 thereof may supplementally function to take up the backlash in said adjusting means 46, in which case said disengaging spring mechanism 42 is connected to said adjusting means 46 as follows: The counterbalancing arm 72 of said adjusting member 66 extends a substantial distance longitudinally between the side walls 32 of said frame and is provided with a notch 192 therein. A floating lever 194 is pivotally mounted on the upper end of each rod 130 by means of the pivot pin 132. In the embodiment shown, each floating lever 194 comprises a bell crank lever having a long arm 198 adapted to register in said notch 192 and a short arm 200 projecting from the opposite side thereof at a relatively small acute angle to the diametric extension of said long arm 198. Said short arm 200 is pivotally connected to the power arm 60 in any suitable manner, such as by the link 202 pivotally connected to said short arm 200 by the pivot pin 206 and pivotally connected to the bearing portion 84 of said power arm by the pivot pin 204. The upper end of each respective rod 130 is pivotally connected to the pivot points of each respective lever, in the embodiment shown, in the following manner: As shown in Fig. 9 each respective lever 194 is provided with a hub portion 210, the central portions of which may be integrally joined together, as shown in Fig. 9. In addition, the short arms 200 thereof may be additionally integrally joined together in the manner shown. A composite shaft 208 comprises the two portions 212 and 214 extending through said integral hub portion 210. The end of each respective shaft portion 212 and 214 is enlarged as at 216 and is provided with a vertical hole 218 extending vertically therethrough through which the upper end of the rod 130 extends. A saddle 220 for the upper end of each rod 130 is supplementally provided having a threaded hole 222 centrally thereof to receive the threaded upper end of the rod 130. After it projects upwardly above its respective hole 218 the saddle 220 may be supplementally secured to said threaded upper end by the locking pin 224 extending therethrough. The composite rod 208 is provided with a female socket portion 226 at the inner end of the portion 212 thereof and a threaded male portion 228 at the end of the opposite portion 214 thereof, said portions being threadedly secured together before the upper ends of the rods 130 having been mounted on the enlarged ends 216 of said composite rod 208 and secured to their respective saddles 220. As shown in Figs. 8 and 10 the respective positions of the floating levers 194 may be reversed if desired so that the short arm 200 thereof may project at an acute angle in the opposite direction to provide a smaller leverage with the same spring 64 should it be desired to substitute a pressing head 40 of less weight.

It is apparent therefore that I have provided the novel improvements in adjusting means for garment pressing machines with the advantages described above.

It is understood that my invention is not limited to the specific embodiments shown and that various deviations may be made without departing from the spirit and scope of the appended claims.

What I claim is:

1. In a garment pressing machine, a frame, a stationary pressing buck mounted on said frame, a pressing lever having a work arm and a power arm and a pressing head on the work arm thereof, pivotally mounted on said frame intermediate the ends thereof to bring said pressing head into and away from pressing juxtaposition with said buck, actuating means for raising the pressing lever power arm, an adjusting member pivotally mounted on the power arm of said pressing lever having an arm connected to said actuating means on one side of the pivot point of said adjusting member to rotate said member to raise said pressing lever power arm and having a counterbalancing arm and a crank arm, spring means acting upon said counterbalancing arm on the opposite side of the pivot point of said adjusting member to rotate said member to lower said pressing lever power arm, manually actuated means mounted on said pressing lever to move axially thereof, a connecting rod connecting said adjusting member crank arm and said axially movable means, whereby said actuating means may raise said power arm, and said spring means may lower said power arm, and axial adjustment of said manually actuated means may adjustably rotate said adjusting member against the pressure of said spring means to vary the effective point of connection of said actuating means to said pressing lever power arm.

2. In a garment pressing machine, a frame having side walls, a stationary pressing buck mounted on said frame, a pressing lever having a pressing head on the work arm thereof pivotally mounted on a longitudinal axis on said frame intermediate the ends thereof to bring said pressing head into and away from pressing juxtaposition with said buck, actuating means for raising the pressing lever power arm, an adjusting member pivotally mounted horizontally of the power arm of said pressing lever having an arm connected to said actuating means to rotate said member to raise said pressing lever power arm, a counterbalancing arm and a crank arm, said counterbalancing arm extending a substantial distance between the side walls of said frame and having a notch therein, a floating lever for each side of said power arm having one arm thereof registering in an end of said notch, a link pivotally connecting the other arm of each floating lever to one side of said pressing lever power arm, a floating pivot rod joining the floating levers on each side together, spring means for each floating lever having one end thereof operatively connected to the pivot rod thereof and the other end thereof operatively anchored to a side wall of said frame, whereby said spring means may act upon said counterbalancing arm to rotate said member to lower said pressing lever power arm, manually actuated means mounted on said pressing lever to move axially thereof, and a connecting rod connecting said adjusting member crank arm and said axially movable means, whereby said actuating means may raise said power arm, and axial adjustment of said manually actuated means may adjustably rotate said adjusting member against the pressure of said spring means to vary the effective point of connection of said actuating means to said pressing lever power arm.

3. In a garment pressing machine, a frame, a stationary pressing buck mounted on said frame, a pressing lever having a pressing head on the work arm thereof pivotally mounted on said frame intermediate the ends thereof to bring said pressing head into and away from pressing juxtaposition with said buck, actuating means for raising the pressing lever power arm, an adjusting member pivotally mounted on the power arm of said pressing lever having an arm connected to said actuating means to rotate said member to move said pressing lever power arm, a counterbalancing arm and a crank arm, spring means acting upon said counterbalancing arm to rotate said member to lower said pressing lever power arm, manually actuated means mounted on said pressing lever to move axially thereof, a connecting rod connecting said adjusting member crank arm and said axially movable means, whereby said actuating means may raise said power arm, and said spring means may lower said power arm, and axial adjustment of said manually actuated means may adjustably rotate said adjusting member against the pressure of said spring means to vary the effective point of connection of said actuating means to said pressing lever power arm, a front handle member for actuating said axially movable adjusting means threadedly connected thereto and having a universal joint in front of said threaded connection whereby said front handle portion may be selectively tilted to a plurality of angular positions on said power arm and means to lock said handle member in a selected position.

4. In a garment pressing machine, a frame, a stationary pressing buck mounted on said frame, a pressing lever having a pressing head on the work arm thereof pivotally mounted on said frame intermediate the ends thereof to bring said pressing head into and away from pressing juxtaposition with said buck, actuating means for raising the pressing lever power arm, an adjusting member pivotally mounted on the power arm of said pressing lever having an arm connected to said actuating means to rotate said member to raise said pressing lever power arm, a counterbalancing arm and a crank arm, spring means acting upon said counterbalancing arm to rotate said member to lower said pressing lever power arm, manually actuated means mounted on said pressing lever to move axially thereof, a connecting rod connecting said adjusting member crank arm and said axially movable means, whereby said actuating means may raise said power arm, and said spring means may lower said power arm, and axial adjustment of said manually actuated means may adjustably rotate said adjusting member against the pressure of said spring means to vary the effective point of connection of said actuating means to said pressing lever power arm, and a front handle member for actuating said axially movable adjusting means threadedly connected thereto and having a universal joint in front of said threaded connection whereby said front handle portion may be selectively tilted to a plurality of angular positions on said power arm.

5. In a garment pressing machine, relatively movable pressing members, actuating means operatively connected to one of said members for moving said member into pressing juxtaposition with said other member, adjusting means including a pivotable portion on said movable member for shifting the point of connection of said actuating means to said movable member to adjust the final pressing space between said pressing members said pivotal portion being connected to said actuating means on one side of its pivot, spring means connected to a point on said garment pressing machine and to said pivotal portion of said adjusting means on the opposite side of its pivot to move said movable member away from pressing juxtaposition with said other member and to continuously function to take up any backlash in said adjusting means, and adjustable means abutting said spring means for varying the tension exerted thereby retained by said spring means in adjusted position thereon.

6. In a garment pressing machine, relatively movable pressing members, actuating means operatively connected to one of said members for moving said member into pressing juxtaposition with said other member, adjusting means including a pivotable portion on said movable member for shifting the point of connection of said actuating means to said movable member to adjust the final pressing space between said pressing members said pivotal portion being connected to said actuating means on one side of its pivot and spring means connected to a point on said garment pressing machine and to said pivotal portion of said adjusting means on the opposite side of its pivot to move said movable member away from pressing juxtaposition with said other member and to continuously function to take up any backlash in said adjusting means.

HERBERT G. BEEDE.

REFERENCES CITED

The following references are of record in the file of this patent:

UNITED STATES PATENTS

| Number | Name | Date |
| --- | --- | --- |
| 876,717 | Johnson | Jan. 14, 1908 |
| 964,651 | Kirk | July 19, 1910 |
| 1,254,227 | Huber | Jan. 22, 1918 |
| 1,328,526 | Krause | Jan. 20, 1920 |
| 1,340,581 | Van Brunt | May 18, 1920 |
| 1,506,820 | Erdman et al. | Sept. 2, 1924 |
| 1,518,220 | Petrie | Dec. 9, 1924 |
| 2,026,264 | Beede | Dec. 31, 1935 |
| 2,076,165 | Schaum | Apr. 6, 1937 |
| 2,099,181 | Strobridge | Nov. 16, 1937 |
| 2,212,188 | Walter | Aug. 20, 1940 |
| 2,252,650 | Strobridge | Aug. 12, 1941 |
| 2,281,859 | Reeves | May 5, 1942 |

FOREIGN PATENTS

| Number | Country | Date |
| --- | --- | --- |
| 629,459 | France | Nov. 10, 1927 |